United States Patent
Melanson

(10) Patent No.: US 7,641,841 B2
(45) Date of Patent: Jan. 5, 2010

(54) METHOD FOR TREATING THERMOPLASTIC POLYURETHANE GOLF BALL COVERS

(75) Inventor: David M. Melanson, Northampton, MA (US)

(73) Assignee: Callaway Golf Company, Carlsbad, CA (US)

( * ) Notice: Subject to any disclaimer, the term of this patent is extended or adjusted under 35 U.S.C. 154(b) by 744 days.

(21) Appl. No.: 11/161,781

(22) Filed: Aug. 16, 2005

(65) Prior Publication Data

US 2007/0040297 A1  Feb. 22, 2007

(51) Int. Cl.
*B28B 1/38* (2006.01)
(52) U.S. Cl. .................. 264/305; 264/241; 264/271.1; 264/279.1
(58) Field of Classification Search ............ 264/241, 264/271.1, 279, 279.1, 305
See application file for complete search history.

(56) References Cited

U.S. PATENT DOCUMENTS

2003/0236137 A1* 12/2003 Morgan et al. ............. 473/377
2004/0077435 A1* 4/2004 Matroni et al. ............. 473/378
2006/0249880 A1* 11/2006 Nagasawa et al. ......... 264/279.1

OTHER PUBLICATIONS

Lambourne, R.; Strivens, T.A. (1999). Paint and Surface Coatings—Theory and Practice (2nd Edition). Woodhead Publishing. Online version available at: http://knovel.com/web/portal/browse/display?_EXT_KNOVEL_DISPLAY_bookid=436 &VerticalID=0 p. 168.*

* cited by examiner

Primary Examiner—Christina Johnson
Assistant Examiner—Galen Hauth
(74) Attorney, Agent, or Firm—Michael A. Catania; Elaine H. Lo

(57) ABSTRACT

A method of forming a golf ball is disclosed herein. The method includes placing a golf ball precursor product with a cover comprising a thermoplastic polyurethane material and a dendritic polymer in a solution containing an isocyanate functionality reactive material. The precursor product is then removed and heated to remove solvent to prepare the precursor product for finishing.

5 Claims, 1 Drawing Sheet

METHOD FOR TREATING THERMOPLASTIC POLYURETHANE GOLF BALL COVERS

BACKGROUND OF THE INVENTION

1. Field of the Invention

The present invention relates to a golf ball. More specifically, the present invention relates to a method for treating a thermoplastic polyurethane golf ball cover.

2. Description of the Related Art

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short life span.

As a result of this negative property, balata and its synthetic substitutes, trans-polybutadiene and transpolyisoprene, have been essentially replaced as the cover materials of choice by other cover materials such as ionomeric resins and polyurethanes.

Ionomeric resins are polymers containing interchain ionic bonding. As a result of their toughness, durability and flight characteristics, various ionomeric resins sold by E.I. DuPont de Nemours & Company under the trademark Surlyn® and by the Exxon Corporation (see U.S. Pat. No. 4,911,451) under the trademarks Escor® and Iotek®, have become widely utilized for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic groups in the copolymer resulting in a thermoplastic elastomer exhibiting enhanced properties, such as durability, for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are many different commercial grades of ionomers available both from DuPont and Exxon, with a wide range of properties which vary according to the type and amount of metal cations, molecular weight, composition of the base resin (for example, relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (for example, "spin", "feel", etc.) characteristics previously associated with the "soft" balata covers, properties which are still desired by the more skilled golfer.

Furthermore, a number of different golf ball constructions, such as one-piece, two-piece (a solid resilient center or core with a molded cover), three-piece (a liquid or solid center, elastomeric winding about the center, and a molded cover), and multi-piece golf balls, have been developed to produce golf balls exhibiting enhanced playability and durability. The different types of materials utilized to formulate the cores, mantles, windings, covers, etc. of these balls dramatically alters the balls' overall characteristics. In addition, multi-layered covers containing one or more ionomer resins or other materials have also been formulated in an attempt to produce a golf ball having the overall distance, playability and durability characteristics desired.

For example, in various attempts to produce a durable, high spin golf ball, the golfing industry has blended the hard ionomer resins with a number of softer ionomeric resins and applied these blends to two-piece and three-piece golf balls. U.S. Pat. Nos. 4,884,814 and 5,120,791 are directed to cover compositions containing blends of hard and soft ionomeric resins. However, it has been found that golf ball covers formed from hard-soft ionomer blends tend to become scuffed more readily than covers made of hard ionomer alone. Consequently, it would be useful to develop a golf ball having a combination of softness and durability which is better than the softness-durability combination of a golf ball cover made from a hard-soft ionomer blend.

Additionally, thermoset and thermoplastic polyurethanes have recently become popular materials of choice for golf ball cover construction. However, these polyurethanes are difficult and time consuming to process. Moreover, the molding of relatively thin wall cover layer(s), i.e., cover layers 0.075 inches or less in cross-sectional thickness, is difficult to accomplish. This limits the desired performance achieved by thin wall cover molding, such as improved distance. Furthermore, golf balls produced utilizing these materials tend to be soft and readily susceptible to scuffing.

U.S. Pat. No. 6,319,152 for a Golf Ball discloses a cover composed of a thermoplastic polyurethane material and a styrene base block copolymer to improve scuff resistance of the cover.

U.S. Pat. No. 6,458,307 for a Method Of Manufacturing A Golf Ball discloses using a polyisocyanate compound to permeate a thermoplastic polyurethane cover for enhanced cover properties.

U.S. Pat. No. 6,924,347 for a Dendritic Macromolecule Compositions For Use In Golf Balls discloses the use of a dendritic macromolecule included in a core, boundary layer or cover of a golf ball.

As a result, it would be further desirable to produce a thermoplastic polyurethane covered golf ball having a thin wall cover construction which exhibits enhanced durability, namely improved cut and scuff (groove shear) resistance, while maintaining and/or improving such characteristics as playability and distance.

BRIEF SUMMARY OF THE INVENTION

The present invention provides a method of improving the durability, namely scuff resistance, of a golf ball with a thermoplastic cover. The invention is able to increase the durability of a golf ball with a thermoplastic polyurethane cover by including or adding into the polyurethane chemical moieties capable of reacting with isocyanate groups and providing isocyanate groups.

One aspect of the present invention is a method of forming a golf ball with a cover comprising a thermoplastic polyurethane material and a dendritic polymer. The method includes placing a golf ball precursor product in a solution to create a solution covered golf ball precursor product. The solution includes a dendritic polymer containing chemical moieties capable of reacting with isocyanate functionalities. Next, the solution covered golf ball precursor product is removed from the solution. Next, the solution covered golf ball precursor product is heated to remove the solvent. Next, the solution covered golf ball precursor product is dipped in a second solution. The solution contains acetone and MDI. The solution covered golf ball precursor product is removed from the solution. Next, the solution covered golf ball precursor product is heated to create a final golf ball precursor product.

Another aspect of the present invention is a method of forming a golf ball. The method begins with placing a golf ball precursor product in a solution to create a solution covered golf ball precursor product. The golf ball precursor product includes a core, a boundary layer and a cover comprising a thermoplastic polyurethane material and a dendritic polymer, which has been incorporated into the cover prior to or during the injection molding process. The solution includes acetone and MDI. Next, the solution covered golf ball precursor product is removed from the solution. Next, the solution covered golf ball precursor product is heated to remove the solvent to create a final golf ball precursor product, wherein the solution covered golf ball precursor product is heated from two to four hours at a temperature ranging from 125° F. to 250° F.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
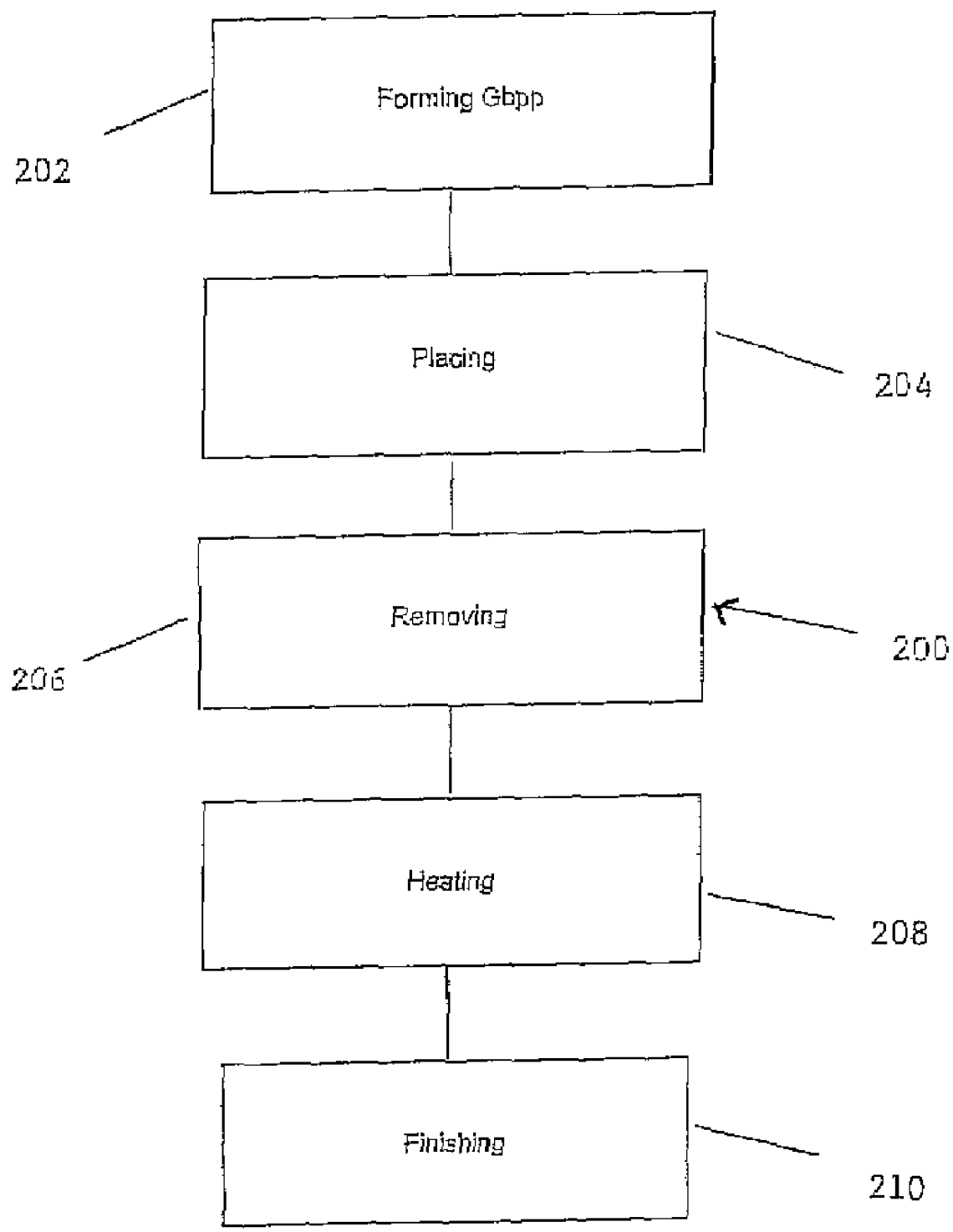
FIG. 1 is a flow chart of a preferred method of the present invention.

As shown in FIG. 1, a method of the present invention is generally designated 200. At block 202, a golf ball precursor product is formed having a cover comprising a thermoplastic polyurethane material and a dendritic polymer containing functional endgroups. The dendritic polymer may be incorporated into the cover as part of a dipping process or may be incorporated prior to or during the injection molding process. In preferred embodiment, the golf ball precursor product is a three-piece solid golf ball and the functional endgroups of the dendritic polymer are capable of reacting with an isocyanate. Alternatively, the golf ball precursor product is a two-piece golf ball with a thermoplastic polyurethane cover. Those skilled in the pertinent art will recognize other golf ball constructions that incorporate a thermoplastic polyurethane cover.

At block 204, the golf ball precursor product is placed in a solution for preferably one to two minutes. The solution includes chemical moieties capable of reacting with functional groups in the dendritic polymer. Such materials may include include polyether-based polyols, polyester-based polyols, diamines, polyamines, diacids, polyacids and mixtures thereof. A preferred solution is an isocyanate solution. The isocyanate solution can be any aliphatic or aromatic isocyanate or diisocyanate or blends thereof known in the art. The isocyanate or diisocyanate used preferably has a solids content in the range of about 1 to about 100 weight % of the isocyanate solution, preferably about 5 to about 50 weight % of the isocyanate solution, most preferably about 10 to about 30 weight % of the isocyanate solution. If it is necessary to adjust the solids content, any suitable solvent that will allow penetration of the isocyanate into the polyurethane, polyurea or polyurethane/polyurea cover material without causing distortion may be used. Examples of suitable solvents include ketone and acetate.

Preferably, the isocyanate used is of the MDI type at 15 to 30% solids reduced with a ketone (such as Mondur ML™ from Bayer Corporation) and dipped for 2 to 3 minutes. Most preferably, the solids level is about 16 to 24% (20±4). It is beneficial that the MDI remain in a liquid state at room temperature. However, this method shall not be limited to the type of polyurethane, polyurea or polyurethane/polyurea material, isocyanate used, concentration of the isocyanate solution, solvent used, dip time, or method of application described above.

At block 206, the isocyanate solution covered golf ball precursor product is removed from the solution. At block 208, the isocyanate solution covered golf ball precursor product is heated to remove the solvent. Preferably, the isocyanate solution covered golf ball precursor product is heated at a temperature ranging from 125° F. to 250° F. for approximately two to four hours. Alternatively, the isocyanate solution covered golf ball precursor product is allowed to air dry at room temperature (approximately 72° F.) for two to six hours. At block 210, the final golf ball precursor product is finished by preferably applying at least one coating layer and an indicia. In a preferred embodiment, the cover is a multi-layer cover comprising an inner cover layer or layers formed over the core. Preferably, the inner cover layer is harder than the outer cover layer, the inner cover layer having a Shore D hardness of at least 60 (or at least about 80 Shore C) as measured on the surface thereof, and a softer outer cover layer comprising thermoplastic polyurethane, polyurea or polyurethane/polyurea formed over the inner cover layer, the outer cover layer having a Shore C hardness of less than 98, preferably a Shore C hardness of 95 or less, more preferably 90 or less, as measured on the surface thereof, the golf ball cover having improved scuff resistance.

In a preferred embodiment, the cover material contains a thermoplastic polyurethane material in an amount of 50 to 99.99 weight percent of the cover and a dendritic polymer in an amount of 0.01 to 50 weight percent of the cover. More preferably, the cover material contains a thermoplastic polyurethane material in an amount of 70 to 99.99 weight percent of the cover and a dendritic polymer in an amount of 0.01 to 30 weight percent of the cover. Even more preferred, the cover material contains a thermoplastic polyurethane material in an amount of 80 to 99.99 weight percent of the cover and a dendritic polymer in an amount of 0.01 to 20 weight percent of the cover. The dendritic polymer may be incorporated into the cover as part of a dipping process or it may be incorporated during or prior to the injection molding process.

A preferred dendritic polymer is BOLTORN H30 from Perstorp Polyols Inc., of Toledo, Ohio.

In another aspect, the present invention provides a golf ball comprising a core, a hard inner cover layer formed over the core, and a softer outer cover layer formed over the inner cover layer. The inner cover layer has a Shore D hardness of at least 60 (or at least about 80 Shore C) as measured on the curved surface thereof and is formed of a composition including at least one material selected from the group of consisting of ionomers, polyamides, polyurethanes, polyureas, polyester elastomers, polyester amides, metallocene catalyzed polyolefins, and blends thereof. The outer cover layer has a Shore C hardness of less than 98, preferably a Shore C hardness of 95 or less, more preferably 90 or less, as measured on the curved surface thereof. It is formed from a composition comprising at least one thermoplastic polyurethane, polyurea or polyurethane/polyurea material.

The golf ball precursor products utilized with the invention can be of a standard or enlarged size. The core may have multiple layers, such as a dual core having a spherical center or inner core and a core layer surrounding the inner core. Additional core layers may also be present. The cover layer is preferably a multi-layer cover comprising at least an inner cover layer and an outer cover, although any number of cover layers, such as 2, 3, 4, 5 or more is possible.

The core or the dual core of the golf ball precursor product can be formed of a solid, a liquid, or any other substance that will result in an inner ball (core and inner cover layer), having the desired COR, compression and hardness. The multi-layered cover preferably comprises two layers: a first or inner layer or ply and a second or outer layer or ply. The inner layer can be ionomer, ionomer blends, non-ionomer, non-ionomer blends, or blends of ionomer and non-ionomer. The outer layer is preferably softer than the inner layer and can be thermoplastic polyurethane, polyurea, polyurethane/polyurea blends, or a blend of a polyurethane/polyurea and ionomer or non-ionomer.

In a further embodiment, the inner layer is comprised of a hard, high acid (i.e. greater than 16 weight percent acid) ionomer resin or high acid ionomer blend. Preferably, the inner layer is comprised of a blend of two or more high acid (i.e. at least 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball. In an additional embodiment, the inner layer is comprised of a hard, low acid (i.e. 16 weight percent acid or less) ionomer blend. Preferably, the inner layer is comprised of a blend of two or more low acid (i.e. 16 weight percent acid or less) ionomer resins neutralized to various extents by different metal cations. The inner cover layer may or may not include a metal stearate (e.g., zinc stearate) or other metal fatty acid salt.

It has been found that a hard inner layer provides for a substantial increase in resilience (i.e., enhanced distance) over known multi-layer covered balls. The softer outer layer provides for desirable "feel" and high spin rate while maintaining respectable resiliency. The soft outer layer allows the cover to deform more during impact and increases the area of contact between the clubface and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving, the playability properties of the ball.

The combination of a hard inner cover layer or layers with a soft, relatively low modulus thermoplastic polyurethane, polyurea or polyurethane/polyurea outer cover layer provides for excellent overall coefficient of restitution (for example, excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

Preferably, the inner cover layer is harder than the outer cover layer and generally has a thickness in the range of 0.010 to 0.150 inches, preferably 0.010 to 0.100 inches, more preferably 0.020 to 0.060 inches for a 1.68 inch ball and 0.030 to 0.100 inches for a 1.72 inch (or more) ball. The core and inner cover layer together form an inner ball having a coefficient of restitution of 0.750 or more and more preferably 0.790 or more, and a diameter in the range of 1.48 to 1.67 inches for a 1.68 inch ball and 1.50 to 1.71 inches for a 1.72 inch (or more) ball. The inner cover layer has a Shore D hardness of 60 or more (or at least about 80 Shore C). It is particularly advantageous if the golf balls of the invention have an inner layer with a Shore D hardness of 65 or more (or at least about 100 Shore C). If the inner layer is too thin, it is very difficult to accurately measure the Shore D, and sometimes the Shore C, of the inner layer as the layer may puncture. Additionally, if the core is harder, this will sometimes influence the reading. If the Shore C or Shore D is measured on a plaque of material, different values will result. The above-described characteristics of the inner cover layer provide an inner ball having a PGA compression of 100 or less. It is found that when the inner ball has a PGA compression of 90 or less, excellent playability results.

The inner layer compositions of the embodiments described herein may include the high acid ionomers such as those developed by E.I. DuPont de Nemours & Company under the trademark Surlyn® and by Exxon Corporation under the trademarks Escort or Iotek®, or blends thereof.

The high acid ionomers which may be suitable for use in formulating the inner layer compositions of various embodiments of the invention are ionic copolymers which are the metal, (such as sodium, zinc, magnesium, etc.), salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10-100%, preferably 30-70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

The high acid ionomeric resins available from Exxon under the designation Escort or Iotek®, are somewhat similar to the high acid ionomeric resins available under the Surlyn® trademark. However, since the Escor®/Iotek® ionomeric resins are sodium or zinc salts of poly(ethylene-acrylic acid) and the Surlyn® resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® 8220 and 8240 (both formerly known as forms of Surlyn® AD-8422), Surlyn® 9220 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

Examples of the high acid acrylic acid based ionomers suitable for use in the present invention also include the Escor® or Iotek® high acid ethylene acrylic acid ionomers produced by Exxon such as Ex 1001, 1002, 959, 960, 989, 990, 1003, 1004, 993, 994. In this regard, Escor® or Iotek® 959 is a sodium ion neutralized ethylene-acrylic neutralized ethylene-acrylic acid copolymer. According to Exxon, Ioteks® 959 and 960 contain from about 19.0 to about 21.0% by weight acrylic acid with approximately 30 to about 70 percent of the acid groups neutralized with sodium and zinc ions, respectively.

Furthermore, as a result of the development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are now available for golf ball cover production. It has been found that these additional cation neutralized high acid ionomer blends produce inner cover layer compositions exhibiting enhanced hardness and resilience due to synergies that occur during processing. Consequently, the metal cation neutralized high acid ionomer resins recently produced can be blended to produce substantially higher C.O.R.'s than those produced by the low acid ionomer inner cover compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, which is hereby incorporated by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the Primacor® designation.

The metal cation salts utilized in the invention are those salts that provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, and magnesium acetate. Sources of manganese include manganese acetate and manganese oxide.

The metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

A number of different types of metal cation neutralized high acid ionomers can be obtained from the above-indicated process. These include high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several cation neutralized acrylic acid based high acid ionomer resins are produced.

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, both of which are hereby incorporated by reference. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (for example, the inner cover layer or layers herein) the resulting golf balls will travel further than previously known multi-layered golf balls produced with low acid ionomer resin covers due to the balls' enhanced coefficient of restitution values.

Alternatively, if the inner cover layer comprises a low acid, the low acid ionomers which may be suitable for use in formulating the inner layer compositions of the subject invention are ionic copolymers which are the metal, (sodium, zinc, magnesium, etc.), salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso-or n-butylacrylate, etc.) can also be included to produce a softer terpolymer. The carboxylic acid groups of the copolymer are partially neutralized (for example, approximately 10 to 100%, preferably 30 to 70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E.I. DuPont de Nemours & Company under the trademark Surlyn® and by Exxon Corporation under the trademarks Escor® or Iotek®, or blends thereof.

The low acid ionomer resins available from Exxon under the designation Escor® and/or Iotek®, are somewhat similar to the low acid ionomeric resins available under the Surlyn® trademark. However, since the Escor®/Iotek® ionomeric resins are sodium or zinc salts of poly(ethylene-acrylic acid) and the Surlyn® resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (for example, the inner cover layer herein) the resulting golf balls will travel further and at an enhanced spin rate than previously known multi-layered golf balls. Such an improvement is particularly noticeable in enlarged or oversized golf balls.

In one embodiment of the inner cover layer, a blend of high and low acid ionomer resins is used. These can be the ionomer resins described above, combined in a weight ratio which preferably is within the range of 10 to 90 to 90 to 10 high and low acid ionomer resins.

Another embodiment of the inner cover layer is primarily or fully non-ionomeric thermoplastic material. Suitable non-ionomeric materials include metallocene catalyzed polyolefins or polyamides, polyamide/ionomer blends, polyphenylene ether/ionomer blends, etc., which have a Shore D hardness of at least 60 (or at least about 80 Shore C) and a flex modulus of greater than about 15,000, more preferably about 30,000 psi, or other hardness and flex modulus values which are comparable to the properties of the ionomers described above. Other suitable materials include but are not limited to thermoplastic or thermosetting polyurethanes, thermoplastic block polyesters, for example, a polyester elastomer such as that marketed by DuPont under the trademark Hytrel®, or thermoplastic block polyamides, for example, a polyether amide such as that marketed by Elf Atochem S. A. under the trademark Pebax®, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

A golf ball inner cover layer according to the present invention formed from a polyurethane material typically contains from about 0 to about 60 weight percent of filler material, more preferably from about 1 to about 30 weight percent, and most preferably from about 1 to about 20 weight percent.

While the core with the hard inner cover layer formed thereon provides the multi-layer golf ball with power and distance, the outer cover layer is preferably comparatively softer than the inner cover layer. The softness provides for the feel and playability characteristics typically associated with balata or balata-blend balls. The outer cover layer or ply is comprised of a relatively soft, low modulus (about 1,000 psi to about 100,000 psi, preferably about 5,000 psi to about 70,000) thermoplastic polyurethane, polyurea or polyurethane/polyurea, or a blend of two or more polyurethanes, or a blend of one or more ionomers or one or more non-ionomeric thermoplastic materials with a thermoplastic polyurethane. The outer layer is 0.005 to about 0.150 inch in thickness, preferably 0.010 to 0.075 inch in thickness, more desirably 0.015 to 0.040 inch in thickness, but thick enough to achieve desired playability characteristics while minimizing expense. Thickness is defined as the average thickness of the non-dimpled areas of the outer cover layer. The outer cover layer preferably has a Shore C hardness of less than 98, preferably 95 or less, and more preferably 90 or less, as measured on the surface of the golf ball. If the inner layer and/or core are harder than the outer layer, this will sometimes influence the reading. If the Shore C is measured on a plaque of material, different values may result.

The outer cover layer of the invention is formed over a core to result in a golf ball having a coefficient of restitution of at least 0.750, more preferably at least 0.780, and most preferably at least 0.790. The coefficient of restitution of the ball will depend upon the properties of both the core and the cover. The PGA compression of the golf ball is 100 or less, and preferably is 90 or less.

In polyurethanes, cross-linking occurs between the isocyanate groups (—NCO) and the polyol's hydroxyl end-groups (—OH), and/or with already formed urethane groups. Additionally, the end-use characteristics of polyurethanes can also be controlled by different types of reactive chemicals and processing parameters. For example, catalysts are utilized to control polymerization rates.

Generally, thermoplastic polyurethanes have some cross-linking, but primarily by physical means. The cross-link bonds can be reversibly broken by increasing temperature, as occurs during molding or extrusion. In this regard, thermoplastic polyurethanes can be injection molded, and extruded as sheet and blow film. They can be used up to about 350° F. to 500° F. and are available in a wide range of hardnesses.

The thermoplastic polyurethane, polyurea or polyurethane/polyurea which is selected for use as a golf ball cover preferably has a Shore C hardness of from about 98 or less, more preferably about 95 or less, and most preferably about 90 or less when measured on the surface of the golf ball. The thermoplastic polyurethane, polyurea or polyurethane/polyurea which is to be used for a cover layer preferably has a flex modulus from about 1 to about 310 Kpsi, more preferably from about 5 to about 100 Kpsi, and most preferably from about 5 to about 70 Kpsi. Accordingly, covers comprising these materials exhibit similar properties.

Non-limiting examples of a polyurethane, polyurea or polyurethane/polyurea suitable for use in the outer cover layer include thermoplastic polyurethanes available from Bayer under the trade name of TEXIN and DESMOPAN, polyurethanes available from BASF under the trade name ELLASTOLAN, polyurethanes available from Dow under the trade name PELLETHANE, and polyurethanes from Noveon Incorporated, such as 58132-XLK-040; 58132-XCT-040; 58134-XL2-040P; 58134-XL4-040P; 58134-XC2-040P; 58134-XC4-040P; 5740x960-XL2; 5740x960-XL4; 5740x960-XC2; and 5740x960-XC4.

Typically, there are two classes of thermoplastic polyurethane materials: aliphatic polyurethanes and aromatic polyurethanes. The aliphatic materials are produced from a polyol or polyols and aliphatic isocyanates, such as $H_{12}MDI$ or HDI, and the aromatic materials are produced from a polyol or polyols and aromatic isocyanates, such as MDI or TDI. The thermoplastic polyurethanes may also be produced from a blend of both aliphatic and aromatic materials, such as a blend of HDI and TDI with a polyol or polyols.

Generally, the aliphatic thermoplastic polyurethanes are lightfast, meaning that they do not yellow appreciably upon exposure to ultraviolet light. Conversely, aromatic thermoplastic polyurethanes tend to yellow upon exposure to ultraviolet light. One method of stopping the yellowing of the aromatic materials is to paint the outer surface of the finished ball with a coating containing a pigment, such as titanium dioxide, so that the ultraviolet light is prevented from reaching the surface of the ball. Another method is to add UV absorbers and stabilizers to the clear coating(s) on the outer cover, as well as to the thermoplastic polyurethane material itself. By adding UV absorbers and stabilizers to the thermoplastic polyurethane and the coating(s), aromatic polyurethanes can be effectively used in the outer cover layer of golf balls. This is advantageous because aromatic polyurethanes typically have better scuff resistance characteristics than aliphatic polyurethanes, and the aromatic polyurethanes are typically lower cost than aliphatic polyurethanes.

A golf ball outer cover layer according to the present invention formed from a polyurethane material typically contains from about 0 to about 20 weight percent of filler material, more preferably from about 1 to about 10 weight percent, and most preferably from about 1 to about 5 weight percent.

Moreover, in alternative embodiments, either the inner and/or the outer cover layer may also additionally comprise up to 100 wt % of a soft, low modulus, non-ionomeric thermoplastic or thermoset material. Non-ionomeric materials are suitable so long as they produce the playability and durability characteristics desired without adversely affecting the enhanced travel distance characteristic produced by the high acid ionomer resin composition. These include but are not limited to styrene-butadiene-styrene block copolymers, including functionalized styrene-butadiene-styrene block copolymers, styrene-ethylene-butadiene-styrene (SEBS) block copolymers such as Kraton® materials from Shell Chem. Co., and functionalized SEBS block copolymers; metallocene catalyzed polyolefins; ionomer/rubber blends such as those in Spalding U.S. Pat. Nos. 4,986,545; 5,098,105 and 5,187,013; silicones; and Hytrel® polyester elastomers from DuPont and Pebax® polyetheramides from Elf Atochem S.A. A preferred non-ionomeric material suitable for the inner and/or outer cover layer includes polyurethane.

Additional materials may also be added to the inner and outer cover layer of the present invention as long as they do not substantially reduce the playability properties of the ball. Such materials include dyes (for example, Ultramarine Blue™ sold by Whittaker, Clark, and Daniels of South Plainsfield, N.J.) (see U.S. Pat. No. 4,679,795); pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, etc., and reinforcing materials such as glass fibers and inorganic fillers, as long as the desired properties produced by the golf ball covers of the invention are not impaired.

Examples of suitable isocyanates include, but are not limited to, 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5,-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI"). Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis (isocyanato methyl) cyclohexane; polymethylene polyphenyl isocyanate ("PMDI"); and meta-tetramethylxylylene diisocyanate ("TMXDI"). Preferably, the diisocyanate is MDI. The term "isocyanate" as used herein includes all of these compounds and other isocyanates.

As mentioned generally above, the isocyanate or diisocyanate used may have a solids content in the range of about 1 to about 100 weight %, preferably about 5 to about 50 weight %, most preferably about 10 to about 30 weight %. If it is necessary to adjust the solids content, any suitable solvent (such as ketone and acetate) that will allow penetration of the isocyanate into the polyurethane cover material without causing distortion may be used.

More preferably, the isocyanate utilized is Mondur ML™, an aromatic diisocyanate manufactured by the Bayer Corporation. According to Bayer, Mondur ML™ is an isomer mixture of diphenyl methane diisocyanate (MDI) containing a high percentage of 2,4 isomer. More particularly, Mondur ML™ reportedly has the following specifications and proportions:

A. Product Specifications

| | | | |
|---|---|---|---|
| Assay, wt % | 99.5 maximum | 2,4 isomer content, % | 50-60 |
| Acidity as HCl, ppm | 30 maximum | Dimer, wt % | 0.3 maximum |

B. Typical Properties

| | | | |
|---|---|---|---|
| Appearance | Clear to light yellow liquid | Specific Gravity @ 25° C. | 1.19 |
| Equivalent weight | 125 | Freezing point | 59°-68° F. (12-20° C.) |
| NCO Content, % | 33.4-33.6 | Flash point (setaflash) | 388° F. (198° C.) |
| Viscosity @ 25° C., mPa * s | 10 | Equivalent wt, avg. (as supplied) | 125 |
| Weight per gallon, Lb. @25° C. | | | |

* These items are provided as general information only. They are approximate values and are not considered parts of the product specification.

The cores of the inventive golf balls typically have a coefficient of restitution of about 0.750 or more, more preferably 0.770 or more and a PGA compression of about 90 or less, and more preferably 70 or less. Furthermore, in some applications it may be desirable to provide a core with a coefficient of restitution of about 0.780 to 0.790 or more. The core used in the golf ball of the invention preferably is a solid. The term "solid cores" as used herein refers not only to one piece cores but also to those cores having a separate solid layer beneath the covers and over the central core. The cores have a weight of 25 to 40 grams and preferably 30 to 40 grams. When the golf ball of the invention has a solid core, this core can be compression molded from a slug of uncured or lightly cured elastomer composition comprising a high cis content polybutadiene and a metal salt of an α, β, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition including compatible rubbers or ionomers, and low molecular weight fatty acids such as stearic acid. Free radical initiator catalysts such as peroxides are admixed with the core composition so that on the application of heat and pressure, a curing or cross-linking reaction takes place.

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc. on a solid, liquid, gel or gas filled center to form a thread rubber layer that is then covered with one or more mantle or cover layers. Additionally, prior to applying the cover layers, the thread wound core may be further treated or coated with an adhesive layer, protective layer, or any substance that may improve the integrity of the wound core during application of the cover layers and ultimately in usage as a golf ball.

In a preferred embodiment, the final golf ball precursor product typically is coated with a durable, abrasion-resistant, relatively non-yellowing finish coat or coats if necessary. The finish coat or coats may have some optical brightener added to improve the brightness of the finished golf ball. In a preferred embodiment, from 0.001 to about 10% optical brightener may be added to one or more of the finish coatings. Preferred finish coatings are solvent based urethane coatings known in the art.

After molding, the golf balls produced may undergo various further processing steps such as buffing, painting and marking as disclosed in U.S. Pat. No. 4,911,451.

The resulting golf ball produced from the hard inner layer and the relatively softer, low flexural modulus outer layer which additionally comprises an isocyanate provide for an improved multi-layer golf ball which provides for desirable coefficient of restitution and durability properties while at the same time offering the feel and spin characteristics associated with soft balata and balata-like covers of the prior art.

The golf balls formed according to the present invention can be coated using a conventional two-component spray coating or can be coated during the process, for example, using an in-mold coating process.

The present invention includes a wide variety of strategies and techniques for improving the scuff resistance of thermoplastic polyurethane covers.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Example 1

Golf balls precursor products comprising thermoplastic polyurethane covers were made. The results are shown in Table 1 below.

The scuff resistance test was conducted in the manner described below. The balls that were tested were primed and top coated. A 56° Wedge (256·12) was mounted in a mechanical swing machine. The club swing speed used is 70 mph. After each hit, the club face is brushed clean using a nylon bristled brush. A minimum of three samples of each ball were tested. Each ball was hit three times at three different locations so as not to overlap with other strikes. The details of the club face are critical, and are as follows:

Groove width—0.026 inches

Groove depth—0.014 inches;

For each strike, a point value is assigned based on a scale from 0.0 to 6.0 with 0.0 representing no visible mark from the strike and 6.0 representing shredding of the material, with consideration given to a potential end user's perception of cover damage. After completing all strikes, determine the average point value. This average point value, or rank, can be correlated to the chart below.

Scuff Test Ranking

Rank Average Point Value

Excellent 0.0-1.0

Very Good 1.1-2.0

Good 2.1-3.0

Fair 3.1-4.0

Borderline 4.1-5.0

Poor (unacceptable) 5.1-6.0

The cut test (off center cut) was performed as described below. An off center cut test was used as it more closely represents actual play. The shear component of this blow makes the off-center cut test the most severe and most useful in determining the cut resistance of a cover material.

TABLE ONE

| Example | Solution | 1st Dip Time | 1st Heating Time | 2nd Dip Time | 2nd Heating Time | Scuff |
|---|---|---|---|---|---|---|
| 1 | 16% MDI in Acetone (Control) | 2 min. | 4 hrs. @ 175 F. | NA | NA | 3.5 |
| 2 | 1.20% Boltorn H30 2.16% MDI in Acetone | 2 min. | Air Dry @ Room Temp | 2 min. | 4 hrs @ 175 F. | 3.3 |
| 3 | 1.2% Boltorn H30 2.16% MDI in Acetone | 2 min. | Air Dry @ Room Temp | 2 min. | 4 hrs @ 175 F. | 2.4 |
| 4 | 1.5% Boltorn H30 2.16% MDI in Acetone | 2 min. | Air Dry @ Room Temp | 2 min. | 4 hrs @ 175 F. | 2.5 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A method of forming a golf ball, the method comprising:
    placing a golf ball precursor product in a solution to create a solution covered golf ball precursor product, the golf ball precursor product comprising a cover comprising a thermoplastic polyurethane material, the solution comprising an isocyanate in an amount of 2.16% by weight of the solution, 1.5% by weight of a dendritic polymer and a solvent;
    removing the solution covered golf ball precursor product from the solution;
    air drying the solution covered golf ball precursor product at approximately 72° F. to create an dried solution covered golf ball precursor product;
    placing the dried solution covered golf ball precursor product in a second solution comprising an isocyanate in an amount of 2.16% by weight of the solution, 1.5% by weight of a dendritic polymer and a solvent to create a second solution covered golf ball precursor product; and
    heating the second solution covered golf ball precursor product to create a final golf ball precursor product.

2. The method according to claim 1 wherein the golf ball precursor product is placed in the solution for one to two minutes.

3. The method according to claim 1 wherein the second solution covered golf ball precursor product is heated from two to four hours at a temperature ranging from 125° F. to 250° F.

4. The method according to claim 1 wherein the solvent is acetone.

5. The method according to claim 1 wherein the solution comprises acetone and 4,4'-diphenylmethane diisocyanate.

* * * * *